June 21, 1966     L. ISENBERG     3,257,265

LAMINATED CRYOGENIC INSULATION

Filed Sept. 14, 1962

INVENTOR.
LIONEL ISENBERG

BY *Robert C. Brown*

ATTORNEY

United States Patent Office 3,257,265
Patented June 21, 1966

3,257,265
LAMINATED CRYOGENIC INSULATION
Lionel Isenberg, Downey, Calif., assignor to Aerojet-General Corporation, Azusa, Calif., a corporation of Ohio
Filed Sept. 14, 1962, Ser. No. 223,779
6 Claims. (Cl. 161—160)

This invention relates generally to an insulation material, and in particular, to a laminated cryogenic insulation material.

In the past cryogenic materials, such as hydrogen, oxygen and nitrogen in the liquid state, have been retained in vacuum insulated vessels. These vessels commonly are double-walled receptacles having the space between the walls evacuated and the walls covered with shields to minimize radiant heat transfer. The major limitation of this type vessel is that it is extremely difficult to maintain a permanent vacuum between the walls of large vessels and to prevent pressure leaks in the walls. Also, the weight of the vessel and the amount of fluid contained therein are dependent upon the load-carrying capacity of the walls of the vessel and the supports between the walls. Still another limitation of the vacuum insulated vessel is that the supports used between the walls must abut the interior wall, thus creating a heat leak problem when the support extends to the outer wall.

Cryogenic insulation applications for aerospace structures and vehicles require maximum efficiency and reliability at a minimum weight. This requirement indicates that the degree of insulative efficiency must be maximized and the unit weight of the insulating component must be minimized. In addition, many aerospace applications require that the insulation system be structurally sound, that is, that the system be self-supporting from a structural viewpoint under the conditions of physical stress encountered in the operation of the system structure and vehicle with which it is used. It is also desirable to have the insulation system contribute to the over-all structural integrity of the vehicle.

It is therefore the principal object of the present invention to provide a cryogenic insulation having the above-noted desirable characteristics.

Another object of the present invention is to provide a non-evacuated structural cryogenic insulation system suitable for use for both propellant tanks and propulsion system components.

In its principal aspect, the present invention comprises a laminated insulation structure wherein there is provided a first layer having low thermal conductivity and high emissivity characteristics and a second layer which has the characteristics of high conductivity, high specific heat and high reflectivity. The first layer employs colloidal particles which are stabilized with a gas of mean-free-path approximating the interstitial distance between the particles, to provide a tightly-bound adsorbed film of gas on each particle. This gas, upon assembly of the particles into a composite layer, completely fills the interstices between the particles, thus providing a resistive barrier to transfer of heat by solid construction, gas conduction and gas convection. Alternatively, the colloidal particles may be gas stabilized by a gas having a condensation point such that at the operating temperature of the insulation system, the gas will condense into colloidal solid particles having an equilibrium gas of mean-free-path approximating the interstitial distance between the colloidal particles. The second layer comprises a metallic radiant heat-transfer barrier which is fabricated into a laminated structure with the gas-stabilized colloidal particle layer. In one embodiment of the invention, this barrier has orientated absorptivity/emissivity characteristics. That is, it will act as a one-way mirror by reflecting heat from its hot surface side away from the cold surface desired to be insulated and by absorbing heat on its cold surface side. Hence, by the present invention there is provided a laminated insulation utilizing a colloidal particle layer which reduces heat transfer by solid conduction and gas conduction and convection, and a metallic barrier which reduces radiant heat transfer in the system.

Other objects, aspects and advantages will become apparent from the following description in connection with the accompanying drawings wherein.

Figure 1:
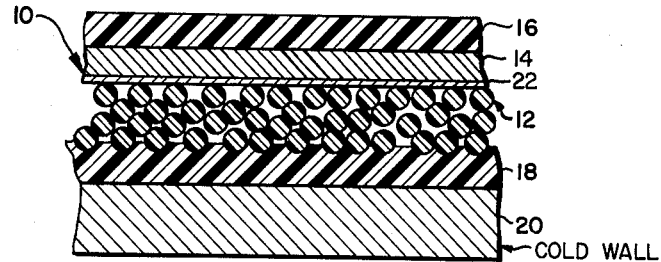
FIG. 1 is a vertical section taken through a cold wall receptacle having insulation thereon made in accordance with the present invention.

In order to best understand the principles upon which the present invention is based, it is first necessary to evaluate the possible modes of heat transfer through an insulating medium and explain how the present invention minimizes each of these modes. The modes of heat transfer are solid conduction, gas conduction, gas convection, and radiation.

Heat transfer by solid conduction occurs when a molecule in a solid vibrates and strikes another solid molecule thereby transferring kinetic energy from the first to the second molecule. This mode of transfer of heat also occurs between individual solid particles in intimate contact. However, between individual solid particles, there exists a film coefficient resistance which resists the flow of heat between those particles by solid conduction. When the number of solid particles is increased, the number of individual film coefficient resistances between the particles also increases, thereby creating an increased resistance to the flow of heat in layers of such particles. The present invention minimizes heat transfer by solid conduction by providing a layer having a larger number of colloidal particles which, due to their small size, maximize the amount of film coefficient resistances occurring in the layer.

The transfer of heat by gas conduction occurs when one gas molecule moves and strikes a second molecule, thereby transferring kinetic energy to the second molecule. In the preferred embodiment of the invention, the colloidal particles of the first layer of the insulation material are gas-stabilized by a gas of mean-free-path, at ambient pressure, which approximates or is greater than the interstitial distance between the colloidal particles. By mean-free-path, it is meant the average distance a free gas molecule must travel to strike another gas molecule. A calculation of the mean-free-path of a gas may be obtained by an analysis of the Van de Waals or other kinetic gas equations. The interstitial distance between the particles may be calculated by taking a statistical average of the interstitial distances, taking into consideration the diameter and geometry of the particles. By gas stabilizing colloidal particles with such a gas, so that the gas completely fills the interstices between said particles, the likelihood of one gas molecule moving and striking another free gas molecule, rather than a surface adsorbed gas colloidal particle, is greatly lessened.

Heat transfer by gas convection occurs when a gas molecule moves from one area and carries kinetic energy with it to a different area. As in the case of gas conduction, the present invention minimizes gas convection since the mean-free-path of the gas between the colloidal particles approximates or is greater than the distance between the particles. Therefore, there is a greater likelihood that a moving gas molecule will strike the surface of a colloidal particle rather than carry its kinetic energy to another area. The fourth mode of heat transfer is radiation. In accordance with the present invention, transfer of radiant energy is minimized inasmuch as the second layer mentioned above comprises a metallic radiant heat transfer barrier having the characteristics of high conductivity, high specific heat, and high reflectivity.

Referring now to the drawings in detail, one embodiment of the present invention is shown in FIG. 1 as an enlarged cross-section. The insulation 10 comprises a first layer 12 of material having the properties of low thermal conductivity and high emissivity. A second radiation shield layer 14 contiguous with layer 12 comprises a material of high conductivity, high specific heat and high reflectivity.

The first layer 12 is comprised of colloidal particles or colloidal fibers of material such as glass, quartz, ceramic, or plastic. Colloidal particles are classically defined as particles having a mean diameter under 0.001 mm. Microspheroids, of such materials, being of a size within the range of colloidal particles, as defined above may also be used. Although they would not provide as efficient an insulation, small particles larger than colloidal particles could also be used. The term "small," as used in the specification and claims, refers to particles having a mean diameter under 0.010 mm. The thickness of layer 12 preferably should be limited to a depth of about 0.001 inch in order to provide radiation shield spacing of about .001 inch or less for greatest efficiency. Other suitable colloidal materials are, by way of example but not of limitation, carbon black, solloidal silica, colloidal copper oxide, and colloidal manganese dioxide black.

The first layer 12 is treated by a gaseous stabilization process to provide a tightly-bound surface adsorbed film of gas on the colloidal particles and to fill the interstices of the layer with the gas. In the preferred embodiment of the invention, the stabilizing gas is insert and has the property of low thermal conductivity and a very low liquefication point. The mean-free--path of the gas at ambient pressure should approximate, that is, be slightly less than, equal to or greater than the interstitial distance between the colloidal particles. Such gases are nitrogen, helium, argon and neon.

Gas stabilization in general may be accomplished by a surface treatment of the colloidal particles to provide the surface conditions which would permit a maximum degree of gas surface adsorption. Thus the energy requirements for physical removal of the surface adsorbed gas would be maximized. Such gas stabilization might be accomplished by one or more of the following processes, but would not be limited to these. For example, the colloidal particles may be heated under a moving stream of an inert gas to a temperature at which surface adsorbed water and other volatile materials would be completely removed. In practice heating under dry nitrogen or helium to a temperature of 600° F. for a period of four or more hours has proved satisfactory. Following heating, the particles are evacuated and cooled under vacuum. After cooling, the clean, dry, pure gas to be surface-adsorbed is supplied to the particles, examples of acceptable gases having been mentioned hereinabove. The gas-stabilized particles are then immediately transferred to to closed, vapor-proof containers for storage until utilized in fabrication.

Surface adsorption characteristics of the particles may be increased by initially providing an etch treament to increase a particulate surface adsorption area. In the case of quartz particles for example, the etching treatment could be effected by a hydrofluoric acid treatment followed by neutralization with an ammonium hydroxide solution, followed next by heating to provide a fluoride complex film on the surface. Other treatments of this type may provide chromium or nickel complex films. Etching may also be accomplished in some cases during the heating process by the use of a vapor etching medium such as dry hydrogen fluoride an titanium tetrachloride.

The second layer 14 in this embodiment of the invention is actually a film of material which is deposited upon the first layer 12. By way of example and not by limitation, such materials of high conductivity, high specific heat, and high reflectivity are copper, tin, aluminum, silver, gold, indium, and nickel. The material film thickness should be great enough to minimize through transmission of incident infrared radiation. The metal may be deposited by condensed vapor, spray, or plating. As an optional feature, metallic layer 14 may be treated by etching or oxidation to provide a layer 22, the purpose of which will be discussed later. Bonding agents, shown as layers 16 and 18, encase the insulator layer 12 and 14, and collodial layer 12 is joined by the bonding agent to the cold wall surface of a receptacle 20 which contains cryogenic fluids or the like. The bonding agent may be, for example, a plastic material such as polyester, nylon, polytetrafluoroethylene, polyvinylbutyral, or polyethylene.

As shown in FIG. 1, the first and second layers 12 and 14 and the bonding agent layers 16, 18, comprise one unit of insulation material. The total thickness of the unit is preferably less than 0.002 inch. Accordingly, a plurality of insulation units may be placed one upon another until a desired thickness of insulation is obtained. Because of the nature of the materials used in the insulation, the basic insulation unit may also be used to structural advantage, and use of this material provides the dual benefits of superior structural integrity and insulation characteristics.

The following example is a suggested method of forming the insulation of the present invention. A suitable bonding agent or adhesive 18 such as polyvinylbutyral is attached to the cold wall receptacle 20. After gas stabilization, layer 12 of the colloidal particles is placed upon the adhesive or bonding agent 18. Then a metallic film of material 14 is deposited upon the colloidal particle layer 12 by a conventional process such as by a condensed vapor, spray, or plating process. Finally, an additional layer of bonding agent 16 is applied to the outer surface to provide a composite laminate structure.

A second unit may be placed on the first, and the entire process repeated until the desired number of units has been deposited upon the cold wall of the receptacle.

As mentioned above, as an optional feature, the cold surface side of the second layer 14, that is, the side facing cold wall 20, may be treated to provide absorptivity/emissivity characteristics for that layer. The layer 14 shown in FIG. 1 is treated either by etching or oxidation to provide layer 22, the two layers together having the above-noted characteristics. By this treatment, the combined layers 14 and 22 will act as a one-way mirror to reflect heat from the hot surface side of layer 14 due to the high reflectivity of layer 14 and adsorb heat energy on layer 22 on the cold surface side of layer 14 due to its dull finish. This arrangement offers the further advantage that layer 14 will emit radiant energy much more readily from its hot surface side than its cold surface side.

Figure 2:
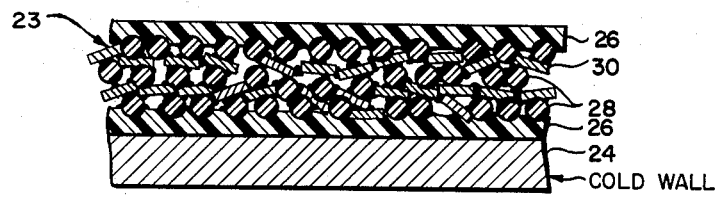
FIG. 2 is a vertical section similar to FIG. 1 but showing another embodiment of the insulation.

Another embodiment of the present invention is illustrated in FIG. 2. The basic insulation 23 deos not have distinct layers as shown in FIG. 1 but rather, there is provided a single layer of syntactic foam which tends to reduce cost and permits more efficient production. Each unit of insulation material is joined to the prior unit, or to the cold wall receptacle 24 by a bonding agent or resin 26, such as polyvinylbutyral or other plastic or adhesive material, suitable for the desired application. The insulation unit includes solid colloidal particles 28, colloidal fibers, microspheroids or small particles under 0.010 mm. which are initially treated by gas stabilization and are then distributed within the bonding agent or resin 26. Metallic platelets 30, which may be of the same material as layer 14, are dispersed at random through the particles 28 and are oriented so that the majority thereof are generally parallel to the layer of colloidal particles and the cold wall receptacle 24. The platelets will be so oriented because of the differential surface tension between the colloidal particles and the interstices between the particles. In other words, the platelets will be generally parallel to the cold wall receptacle 24 since it requires less kinetic energy for the platelets to orient themselves on top of the colloidal particles rather than between the particles in a direction perpendicular to the substrate surface 24. The choice of the type of particles 28 is the same as the previous examples disclosed with relation to the embodiment illustrated in FIG. 1. The platelets 30 may be formed by any suitable method as is well-known in the art. The platelets should be of sufficient size and number to provide, on a statistical basis, a radiant energy reflecting barrier. The platelets may be formed, as for example, by a vapor process, as is well-known in the art, in which atomized metal is vaporized and condensed on a flat surface to form platelets having a thickness great enough to minimize through transmission of incident infrared radiation. It has been found that platelets having a thickness of about 0.0001 inch. perform most favorably.

The fabrication of an intimate mixture of colloidal particles 28 and micro-platelets 30 into a syntactic foam may be accomplished by several means. By one method, the colloidal particles and platelets may be mechanically dispersed within a bonding agent or resin 26 of 100% solid content and viscosity low enough to support the dispersion and yet not fracture the colloidal particles or platelets due to mechanical shear forces. Such dispersions are usually accomplished through the use of high speed mixers.

The mechanical mixture may also be accomplished by air blowing a combination of resin prepolymer, colloidal particles and platelets with a solution of resin into a solvent such as acetone followed by evaporation of the solvent under controlled conditions into a chamber of sufficient temperature to partially polymerize the resin. The mixture could also be effected by intimately mixing the colloidal particles and platelets within a solution of resin followed by evaporation of the solvent under controlled conditions.

After mixture of the colloidal particles and platelets, a layer of the mixture is deposited on the receptacle 24 and is joined thereto by the bonding agent 26 in the mixture.

The number of layers joined to the receptacle in FIG. 2 may be repeated until the desired amount of insulation or structural material is obtained.

Although the efficiency of this insulation material would be slightly less than that illustrated in FIG. 1, it should be noted that this embodiment of the present invention may be constructed in much less time than the former embodiment.

It should be also noted that one requirement of the syntactic foam in FIG. 2 is that the bonding agent 26 should be of only of sufficient quantity to provide a contact adhesive at the junction of the colloidal particles and platelets and not of sufficient quantity to fill the interstitial cavities between the particles and platelets. Thus, most of the characteristics of the first embodiment of the invention are retained and the resistance to conductive heat transfer between the particles is maintained at a high level. It should be further noted that an equivalent of a film contact coefficient, that is, a resistance to heat flow, is maintained between the particles because of the very thin film of adhesive resin and the minimum contact area between the particles.

Figure 3:
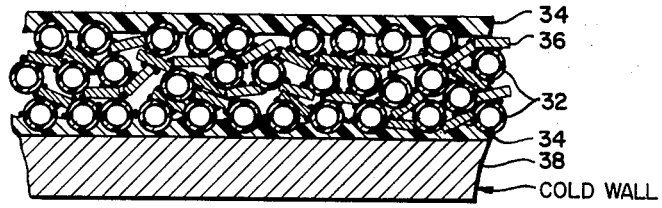
FIG. 3 is a vertical section similar to FIG. 1 but illustrating a still further embodiment of the present invention.

Another embodiment of syntactic foam is illustrated in FIG. 3. It consists of hollow microspheroids 32 adhered to one another by a bonding agent or resin 34 such as polyvinyl chloride. The microspheroids may be composed of glass, quartz, ceramic, or plastic. The microspheroids may be treated to provide surface adsorbed film by gas stabilization in the manner explained before. The syntactic foam may be fabricated by casting an intimate mixture of resin, microspheroids, and radiation shielding platelets 36 onto a vessel wall 38 and subsequently curing the resin. This embodiment has one advantage over the embodiment illustrated in FIG. 2 in that the hollow microspheroids 32 are lighter in weight than the particles 28.

There is a second and entirely different means of achieving an insulation system having an interstitial gas of a mean-free-path approximating the interstitial distance between the particles. This involves an interstitial gas which, at the operating temperature of the insulation system, condenses to solid colloidal particles whose equilibrium gas has a mean-free-path approximating the interstitial distance. In this embodiment, as in each of the previously described embodiments of the invention, solid colloidal particles are initially gas-stabilized. The stabilizing gas should be somewhat inert, have a high condensation point and be sublimeable. That is, it must be capable of passing from the solid state directly to the gaseous state or vice versa without passing through the liquid state. Examples of such gases are carbon dioxide, methane, propane, krypton, xenon, sulfur dioxide, naphthlene and chlorofluorinated hydrocarbons.

To make an insulation using any of these gases, solid colloidal particles are gas-stabilized in a manner explained before and may be combined with a metallic film, as shown in FIG. 1 above, or made into a syntactic foam as shown in FIGS. 2 and 3. The resulting insulations will appear identically to those shown in FIGS. 1–3, and therefore have not been illustrated again. When the gas-stabilized colloidal particles are cooled to the temperature of the insulation system, which may be around $-420°$ F. if a hydrogen tank is being insulated, the gas will be cooled below its condensation point. Hence, it will transform into solid colloidal particles having an equilibrium gas, at equilibrium vapor pressure, of a mean-free-path approximating the interstitial distance between the solid colloidal particles and colloidal particles of condensed gas. Since the interstitial gas has a mean-free-path approximating the distance between the particles, the same effect obtained in the other embodiments will be achieved.

It will of course be understood that various changes can be made in the form, details, arrangement, and proportions of the various parts without departing from the spirit and scope of the invention as defined by the following claims.

I claim:

1. An insulation comprising a layer of small particles, a gas of mean-free-path approximating the interstitial distance between said particles filling the interstices between said particles, a metallic layer in contiguous relation with said particle layer, and a metallic oxide formed on the metallic layer.

2. An insulation as set forth in claim 1 wherein said metallic oxide is formed on the surface of said metallic layer facing said particle layer.

3. An insulation comprising a layer of small particles, a gas of mean-free-path approximating the interstitial distance between said particles filling the interstices between said particles, a metallic layer in contiguous relation with said particle layer, and the metallic layer having an etched surface on the side facing said particle layer.

4. An insulation comprising a layer of small particles, a gas of mean-free-path approximating the interstitial distance between said particles filling the interstices between said particles, and a plurality of metallic platelets interspersed within said particle layer.

5. An insulation as set forth in claim 4 wherein said particles are microspheroids.

6. An insulation in the form of a syntactic foam comprising a layer of small particles, a gas of mean-free-path approximating the interstitial distance between said particles filling the interstices between said particles, a plurality of metallic platelets interspersed within said particle layer, and a bonding agent attached to said particles and platelets, thereby bonding said particles and platelets into a contiguous mass.

References Cited by the Examiner

UNITED STATES PATENTS

| | | |
|---|---|---|
| 2,067,015 | 1/1937 | Munters. |
| 2,108,212 | 2/1938 | Schellens _____ 161—43 |
| 2,748,019 | 5/1956 | Schramm. |
| 2,806,509 | 9/1957 | Bozzacco et al. _____ 154—45.9 |
| 2,934,456 | 4/1960 | Schutt _____ 156—279 |

ALEXANDER WYMAN, *Primary Examiner.*

MORRIS SUSSMAN, EARL M. BERGERT, *Examiners.*